June 5, 1956  T. J. PEUKERT, SR., ET AL  2,748,576
FRUIT AND VEGETABLE COOLER
Filed Oct. 28, 1952  2 Sheets-Sheet 1
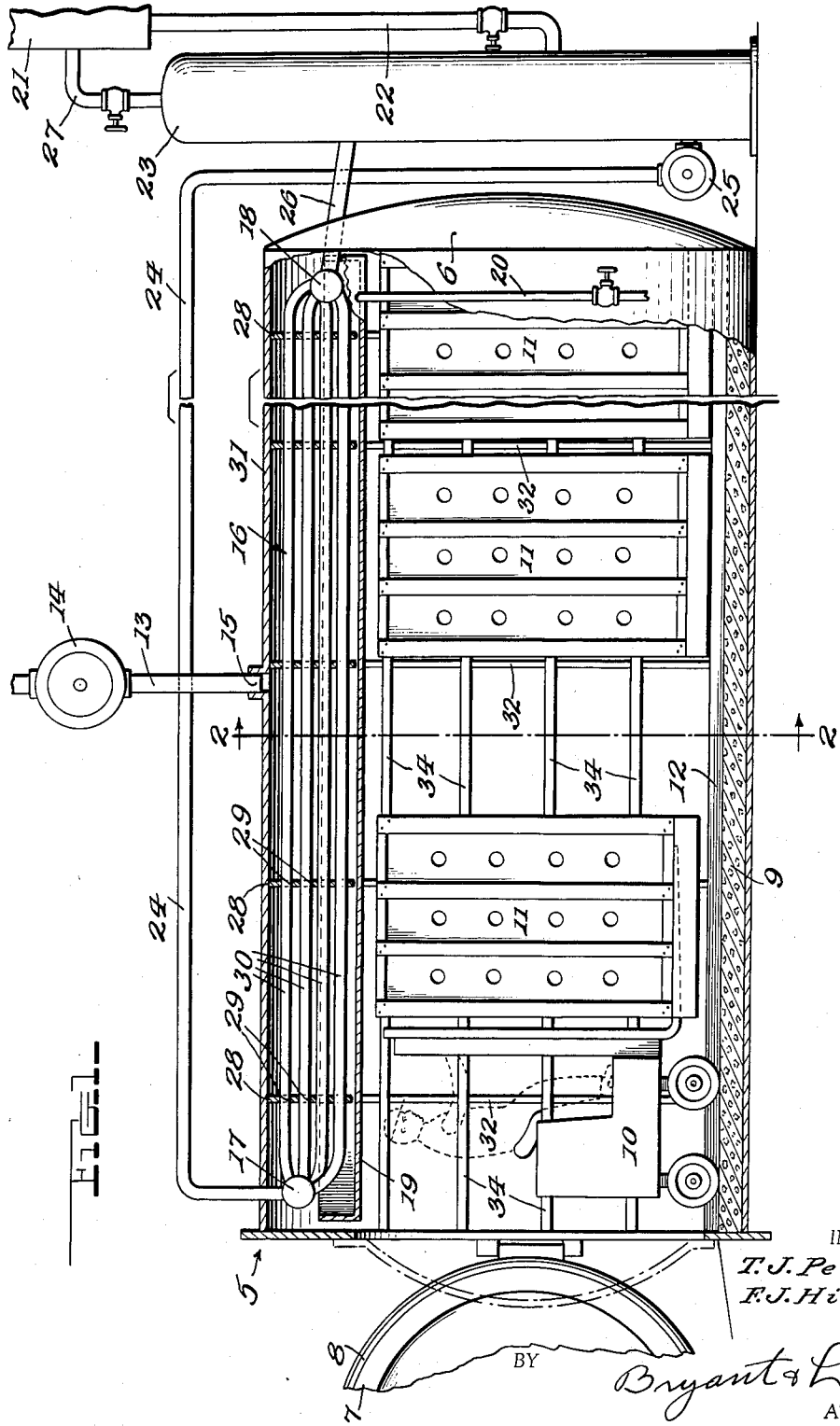
INVENTORS
T. J. Peukert, Sr.
F. J. Hibbs, Sr.
BY Bryant & Lowry
ATTORNEYS

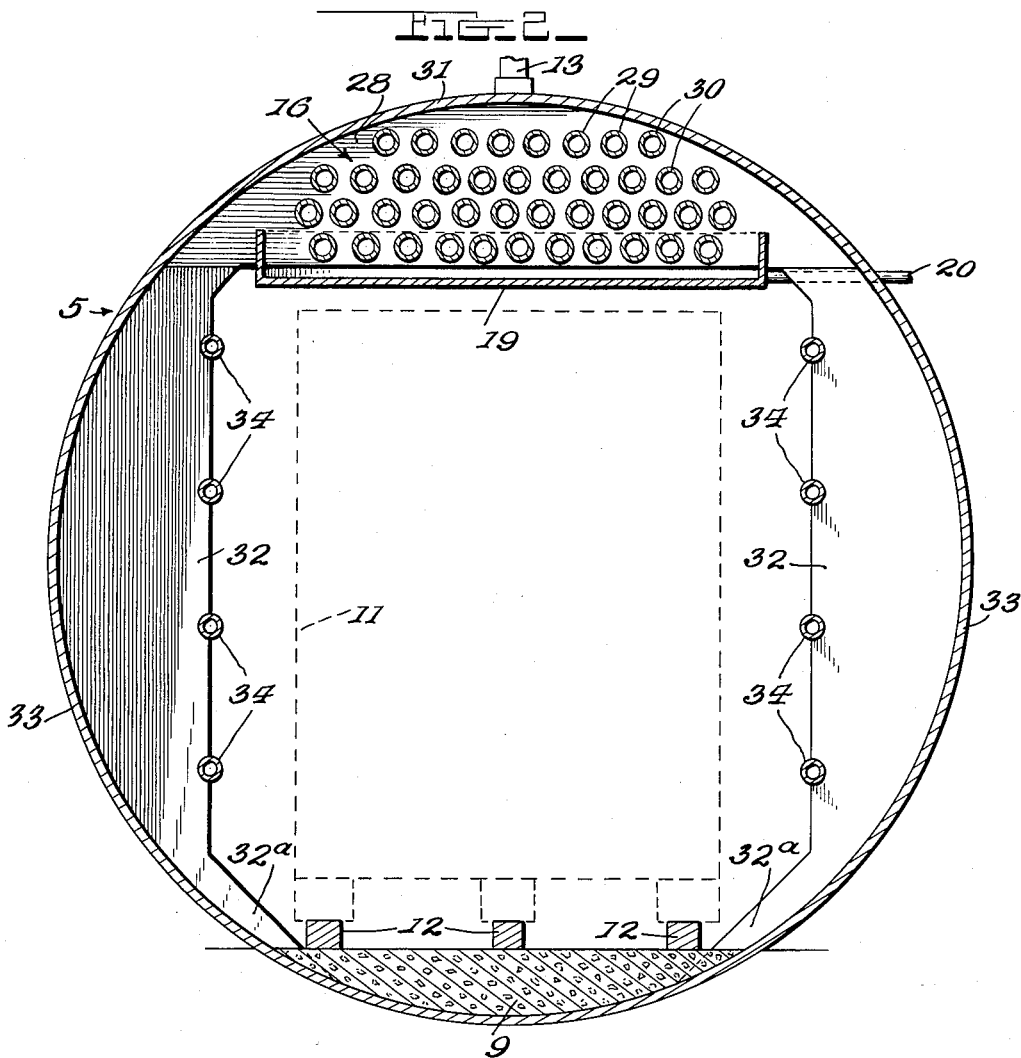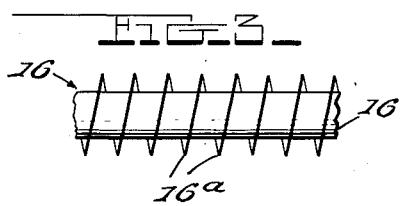

United States Patent Office 2,748,576
Patented June 5, 1956

2,748,576
FRUIT AND VEGETABLE COOLER

Theodore J. Peukert, Sr., and Frank John Hibbs, Sr., Los Angeles, Calif.

Application October 28, 1952, Serial No. 317,236

8 Claims. (Cl. 62—169)

In the handling of fruits and vegetables from the grove or field to the market, it is frequently necessary to ship the produce considerable distances by truck or railroad, making it necessary to guard against spoilage as much as possible.

The usual method of preserving the produce to prevent decay during transit is to precool by refrigeration. Such refrigeration is effected at normal atmospheric pressures, under which condition germ life becomes dormant but can again become active upon return of the produce to normal temperatures in the process of handling and utilization at the destination.

The present invention precools the produce within a high vacuum and largely destroys germ life instead of merely rendering it dormant. Therefore, before decay can occur at the destination, a new source of germs and bacteria must be present, and due to the ever increasing use of modern terminal facilities such sources are rapidly dwindling. The invention therefore makes it possible not only to effect great savings by reducing spoilage, but to supply the market with better looking and more saleable produce.

It is, of course, desirable to effect the precooling as rapidly as possible and to provide a precooling chamber of large capacity to avoid unnecessary delays. To accomplish this without an elaborate, specially constructed vacuum pump, the invention makes use of vapor condensation to aid a vacuum pump in rapidly reducing the pressure within a large chamber, making it possible to utilize any of various vacuum pumps constituting standard factory output.

The vapor to be condensed is supplied by the produce itself, and this vapor is liberated as the pressure drops within the container or casing. The liberated vapor is partially condensed by refrigeration coils. Non-condensable gases and the remaining water vapor are withdrawn through entrances located along the coil into the air outlet line leading from the container or casing to the vacuum pump, thus insuring an even flow of vapor laden air over said coil for rapid condensation of the vapor.

While the condensation of vapor is desirable to aid in producing the desired vacuum, the condensate necessarily drips from the coil during the first portion of the cooling operation and later freezes on said coil in the form of frost. When refrigeration is shut off and the chamber door or doors opened for unloading and reloading, this frost melts and again there is drippage from the coil. Were the drippage allowed to reach the shipping containers and contents and the chamber floor, it would create very undesirable conditions, particularly if more or less slimy. A drip pan is provided, however, for catching all dripping condensate and allowing it to be washed out, thereby avoiding such conditions.

The invention is designed to provide a simple, inexpensive, efficient and durable apparatus making the desired results possible.

In carrying out the above end, a horizontally elongated cylindrical metal casing provides the necessary chamber, and a further object of the invention is to provide effective reinforcing means for bracing said casing against distortion under the influence of outside air pressure when a high vacuum is created in said chamber.

The aforementioned bracing may be applied to the casing either internally or externally and when applied internally, portions of the bracing may be used to support the refrigeration coils and the drip pan by means of a novel construction.

A still further object is to provide a novel construction in which parts of the reinforcing means may form parts of two parallel longitudinal fences between which the produce crates or the like are to be placed.

With the above and other objects in view, as will be presently apparent, the invention consists in general of certain novel details of construction and combinations of parts hereinafter fully described, illustrated in the accompanying drawings, and particularly claimed.

In the drawings, like characters of reference indicate like parts in the several views, and Figure 1 is a vertical longitudinal sectional view partly in elevation, showing the apparatus;

Figure 2 is an enlarged transverse sectional view on line 2—2 of Figure 1; and

Figure 3 is a fragmentary side view of a finned refrigerator pipe coil.

The construction disclosed in the drawings will be rather specifically described, but variations may, of course be made within the scope of the invention as claimed.

A horizontally elongated cylindrical casing 5 has a wall 6 at its rear end and a door 7 at its front end, but it is to be understood that a door may be provided at both ends so that a straight line of passage may be had completely through the casing. A sealing gasket 8 is shown for the door 7. The casing bottom is provided with a floor 9 that may be constructed of any preferred material, such as metal or wood, and the floor is illustrated as being comprised of concrete and upon which a conventional fork truck 10 or other conveyance may move to place produce containers into the casing and later to remove them. It will also be understood that in lieu of the fork truck other means of support, such as dollies, may be utilized for the support of the goods. The floor 9 is preferably provided with rails 12 or other means for guiding the loading conveyance wheels and to form sills upon which the containers 11 may be rested.

An air outlet line 13 extends from the top of the casing 5 to a conventional vacuum pump 14. Under the inlet end 15 of this line 13, and extending from end to end of the casing 5, is a horizontal refrigeration coil 16 having headers 17 and 18 at its end. Under the coil 16 there is a drip pan 19 for catching all condensate dripping from said coil. A drain line 20 extends from the pan 19 and carries off the condensate and any water used to wash it from said pan. Where space considerations make it advisable, the coils may be located at the sides of the casing 5 in addition to the coils 16 at the top and when desired the top coils may be eliminated and only side coils used with an associated drip pan. Also, in lieu of single coils at the top or sides of the casing 5, it is intended that such coils may be fabricated into two or more sections, each having two headers.

The tank 5 is installed in a convenient relation with a refrigeration plant, a portion of which is indicated at 21 in Figure 1. A liquid line 22 extends from the plant 21 to a low pressure refrigerant receiver 23, and a line 24 extends from said receiver to the header 17. This line 24 is provided with a refrigerant liquid pump 25. A suction line 26 extends from the header 18 to the receiver 23, and a refrigerant gas return line 27 extends from the upper end of said receiver to the plant 21.

Where internal reinforcement is used, vertically disposed transverse reinforcing plates 28 are disposed within the upper portion of the casing 5 and are welded to the casing wall. These plates 28 are spaced apart along the length of the casing 5 and are formed with openings 29 receiving the various reaches 30 of the coil 16. These plates 28 thus perform the dual function of stiffening the top 31 of the casing 5 and providing hangers for the coil 16. This coil may be provided with fins 16ª as seen in Figure 3, if desired.

Vertically elongated reinforcing plates 32 are disposed in the casing 5 at the sides of the latter and are spaced apart longitudinally of said casing. These plates are welded to the side walls 33 of the casing and have inwardly and downwardly directed tapered lower ends 32ª which extend into the concrete floor 9. Longitudinal vertically spaced pipes 34 are welded to the vertical inner edges of the plates 32 and extend from end to end of the casing 5. The plates 32 thus coact with the pipes 34 in forming two parallel vertical fences or walls between which the crates or the like 11 are to be placed, and said plates 32 also perform the function of stiffening the casing side walls 33.

These plates 32 terminate at the lines of juncture with the vertically transverse reinforcing plates 28 and are in line with and welded to said plates 28. Said reinforcing plates 28 and said plates 32 are also welded to side walls 31 and 33 at the lines of juncture with said walls. Drip pan 19 is also supported by reinforcing plates 28 as, for example, by notching the pan sides to receive the reinforcing plates that are welded thereto but sufficient space is allowed between plates 28 and bottom of drip pan 19 to permit water to flow along pan beneath plates 28 and thus drain pan from end to outlet line 20. Sufficient space is also allowed between side of drip pan 19 and top of casing top 31 and between side of drip pan 19 and side walls of chamber 33 to allow ample passage for air, water vapor and/or steam to coil 16 at the highly rarefied state and increased volume at which it exists under high vacuum conditions.

In operating the apparatus, the casing 5 is loaded with the crates or the like 11 containing the produce to be precooled. The door or doors 7 are then closed and sealed, the vacuum pump 14 is started, and the refrigerating means is thrown into operation. Assuming that the produce is lettuce at 70° F. for example, the vacuum is pumped down until it reaches 29.18 inches (standard mercury tube) when the natural water in the lettuce starts to evaporate, producing steam. Operation of the vacuum pump is continued and when a vacuum of 29.4 is reached the water in the lettuce will be evaporating at a temperature around 60° F. Continuing this condition, when the vacuum reaches 29.56 inches, the water remaining in the lettuce will be cooled down to about 50° F. by the water that evaporates. At 29.67 inches the corresponding temperature is 40° F. and at 29.74 inches the evaporating temperature is 32° F. The pump usually continues down to about 29.8 inches of vacuum because of temperature lag of the evaporating water, but at 29.8 inches, practically all the lettuce and the water remaining in the lettuce will have reached a temperature of 32° F. which is the desired shipping temperature. Meanwhile, the evaporated water or steam has been condensing on the coil 16. The condensate drips from this coil into the pan 19 until sufficient temperature drop has occurred to freeze the condensate on the coil in the form of frost. Throughout the condensation period, the condensing of the vapor or steam aids the vacuum pump in producing the vacuum, and the desired result is thus quickly attained.

The condensate caught in the pan 19 as it drips from the coil 16, both during operation of the apparatus and when the frost melts during unloading and reloading, may be readily washed from said pan into the drain 20, and there is no danger of any of this condensate reaching the crates or the like 11 and the floor 9. If the condensate were allowed to drip onto the crates or the like, it would not only interfere with easy handling but would leave stains which would detract from the appearance of the shipment and interfere with sales. If it were allowed to drip onto the floor, it would inconvenience loading and unloading, particularly if slimy. It is therefore very important to provide for catching all drip from the refrigerating coil. It will also be understood that the spaces between the vertical reinforcing plates 32 may be filled with concrete or other packing material for reducing in volume the vacuum space within the casing.

From the foregoing it will be seen that a novel construction has been disclosed for attaining the desired ends, but attention is again invited to the possibility of making variations. Moreover, it is to be understood that the invention is not restricted to use for cooling vegetables and fruits but may also be used for other moisture-containing products.

What is claimed as new, is:

1. In an apparatus of the class described, the combination of a casing in which to place produce to be cooled, said casing having a door at least at one end thereof and sealing means for the door, refrigeration coils within said casing at and along the entire top thereof to condense the water vapor evaporated from the produce, means for exhausting air from said casing and a vacuum pump in communication with said air exhausting means, means for circulating a refrigerant through said coils, a pan mounted below said coils in relatively close relation thereto to prevent dripping of moisture from the coils onto the produce to be cooled, said pan being so arranged and disposed with respect to said coils and casing and terminating at its opposite side edges in spaced relation to the walls of the casing as to give a maximum space on both sides of said pan along the entire length of the casing for the passage of water vapor in its path of travel from the produce to be cooled to said refrigeration coils where said water vapor is condensed, and a drain line extending from said pan.

2. Apparatus as in claim 1, wherein the admission end of said air exhausting means is disposed along said casing adjacent to said coils whereby air being exhausted from said casing will impinge upon said coils and condense entrained water vapor in flowing toward said air exhausting means.

3. In an apparatus of the class described, the combination of a casing in which to place produce to be cooled, said casing having a door and sealing means for said door, an air exhausting line from the upper portion of said casing and a vacuum pump to which said line extends, a refrigerant coil in said upper portion of said casing at and along the entire top thereof to condense the water vapor evaporated from the produce, means for circulating a refrigerant through said coil, a pan mounted under said coil in relatively close relation thereto to prevent dripping of moisture from the coils onto the produce to be cooled, said pan being so arranged and disposed with respect to said coils and casing and terminating at its opposite side edges in spaced relation to the walls of the casing so as to give a maximum space on both sides of said pan along the entire length of the casing for the passage of water vapor in its path of travel from the produce to be cooled to said refrigeration coils where said water vapor is condensed, and a drain line extending from said pan.

4. An apparatus as specified in claim 1; the admission end of said air exhausting line being disposed above said coil for condensing the water vapor evaporated at the produce when cooling said produce, whereby air being exhausted from the casing will impinge upon said coil and condense entrained steam in flowing toward said air exhausting line.

5. In a produce cooling apparatus, wherein the produce is cooled by evaporating moisture from the produce and condensing said moisture at refrigerating coils contained in the apparatus, a horizontally elongated cylindrical casing having a chamber in which a vacuum is produced, a door at least at one end thereof, vertically disposed reinforcing plates within said casing and disposed at the side walls of said casing, said plates being spaced apart along the length of said casing and having vertical inner edges and vertically spaced longitudinal members secured to said inner edges of said plates and coacting with the latter in forming fences between which to place the produce to be cooled.

6. An apparatus as specified in claim 5; together with a concrete floor in said casing, said plates having downwardly and inwardly directed extensions at their lower ends, said extensions extending into said concrete floor.

7. An apparatus as specified in claim 5; together with transverse vertically disposed reinforcing plates under the casing top and secured thereto and vertically alined with and further secured to the upper edges of the vertically disposed reinforcing plates, and a coil drip pan secured to and suspended from the lower edge of the transverse reinforcing plates.

8. An apparatus as specified in claim 5; together with transverse vertically disposed reinforcing plates under the casing top and secured thereto annd having the lower edges thereof adjacent opposite ends secured to the upper mating edges of said vertically disposed reinforcing plates, a refrigerant coil supported by said transverse plates, and a drip pan under said coil and supported by said transversely extending reinforcing plates.

References Cited in the file of this patent

UNITED STATES PATENTS

| | | |
|---|---|---|
| 1,161,992 | Starr et al. | Nov. 30, 1915 |
| 1,458,403 | Glessner | June 12, 1923 |
| 1,595,443 | Bausman | Aug. 10, 1926 |
| 2,256,993 | Van Vleet | Sept. 23, 1941 |
| 2,345,204 | Lodwig | Mar. 28, 1944 |
| 2,373,333 | Onge | Apr. 10, 1945 |
| 2,565,943 | Berestneff | Aug. 28, 1951 |
| 2,634,591 | Beardsley | Apr. 14, 1953 |